US010567263B2

(12) United States Patent
McLaughlin Bursell et al.

(10) Patent No.: US 10,567,263 B2
(45) Date of Patent: Feb. 18, 2020

(54) TECHNOLOGIES FOR SIMULATING SERVICE DEGRADATION IN A SOFTWARE DEFINED NETWORK

(71) Applicants: Michael Hingston McLaughlin Bursell, Halstead (GB); Stephen T. Palermo, Chandler, AZ (US); John J. Browne, Limerick (IE); Chris MacNamara, Limerick (IE); Pierre Laurent, Quin (IE)

(72) Inventors: Michael Hingston McLaughlin Bursell, Halstead (GB); Stephen T. Palermo, Chandler, AZ (US); John J. Browne, Limerick (IE); Chris MacNamara, Limerick (IE); Pierre Laurent, Quin (IE)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 15/241,701

(22) Filed: Aug. 19, 2016

(65) Prior Publication Data
US 2018/0054379 A1    Feb. 22, 2018

(51) Int. Cl.
*H04L 12/26* (2006.01)

(52) U.S. Cl.
CPC .................... *H04L 43/50* (2013.01)

(58) Field of Classification Search
CPC .... H04L 43/50; H04L 43/062; H04L 43/0823
See application file for complete search history.

(56) References Cited

U.S. PATENT DOCUMENTS

| 7,633,939 | B2* | 12/2009 | Curran-Gray | ......... H04L 41/145 370/389 |
| 8,532,970 | B2* | 9/2013 | White | ............... G09B 19/0053 703/13 |
| 8,988,983 | B1* | 3/2015 | Brandwine | ............. H04L 69/40 370/218 |
| 2009/0319249 | A1* | 12/2009 | White | ............... G09B 19/0053 703/13 |
| 2015/0134232 | A1* | 5/2015 | Robinson | ............. G08G 1/0116 701/117 |
| 2015/0172104 | A1* | 6/2015 | Brandwine | ............. H04L 69/40 709/224 |
| 2016/0134491 | A1* | 5/2016 | Cordray | ............. H04L 41/0213 709/224 |
| 2016/0218951 | A1* | 7/2016 | Vasseur | ................... H04L 43/12 |
| 2018/0024866 | A1* | 1/2018 | Yoshimura | .......... G06F 9/45558 709/226 |

* cited by examiner

*Primary Examiner* — Uzma Alam
(74) *Attorney, Agent, or Firm* — Barnes & Thornburg LLP (57) ABSTRACT

Technologies for simulating service degradation in telemetry data include a simulator device. The simulator device is to identify a telemetry data stream from a production system to a first management system. The simulator device is also to fork a copy of the telemetry data stream for transmission to a second management system, determine perturbations associated with a determined service degradation type, and apply the perturbations to the forked telemetry data stream. Other embodiments are also described and claimed.

18 Claims, 6 Drawing Sheets

TECHNOLOGIES FOR SIMULATING SERVICE DEGRADATION IN A SOFTWARE DEFINED NETWORK

BACKGROUND

Large data centers and telecommunication deployments typically generate significant amounts of monitoring and telemetry data. This is especially true when those deployments, or portions of them, are virtualized, as data is generated not only from hosted or "service" workloads, but also from the infrastructure and virtualization layers. In typical systems, the generated data may be reviewed offline and analyzed to propose changes to the configuration of the system. In some systems, for testing purposes, human operators may force failures of live components, such as by bringing network links down, removing storage devices, and other acts that cause faults to occur in the live system. As such, users of the system may experience degraded performance resulting from these faults. Other techniques include deliberate insertion of latencies to degrade service or adding hostile network packets to attempt to force abnormal behavior in the system. Again, these techniques cause real performance degradation that is experienced by customers using the system.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
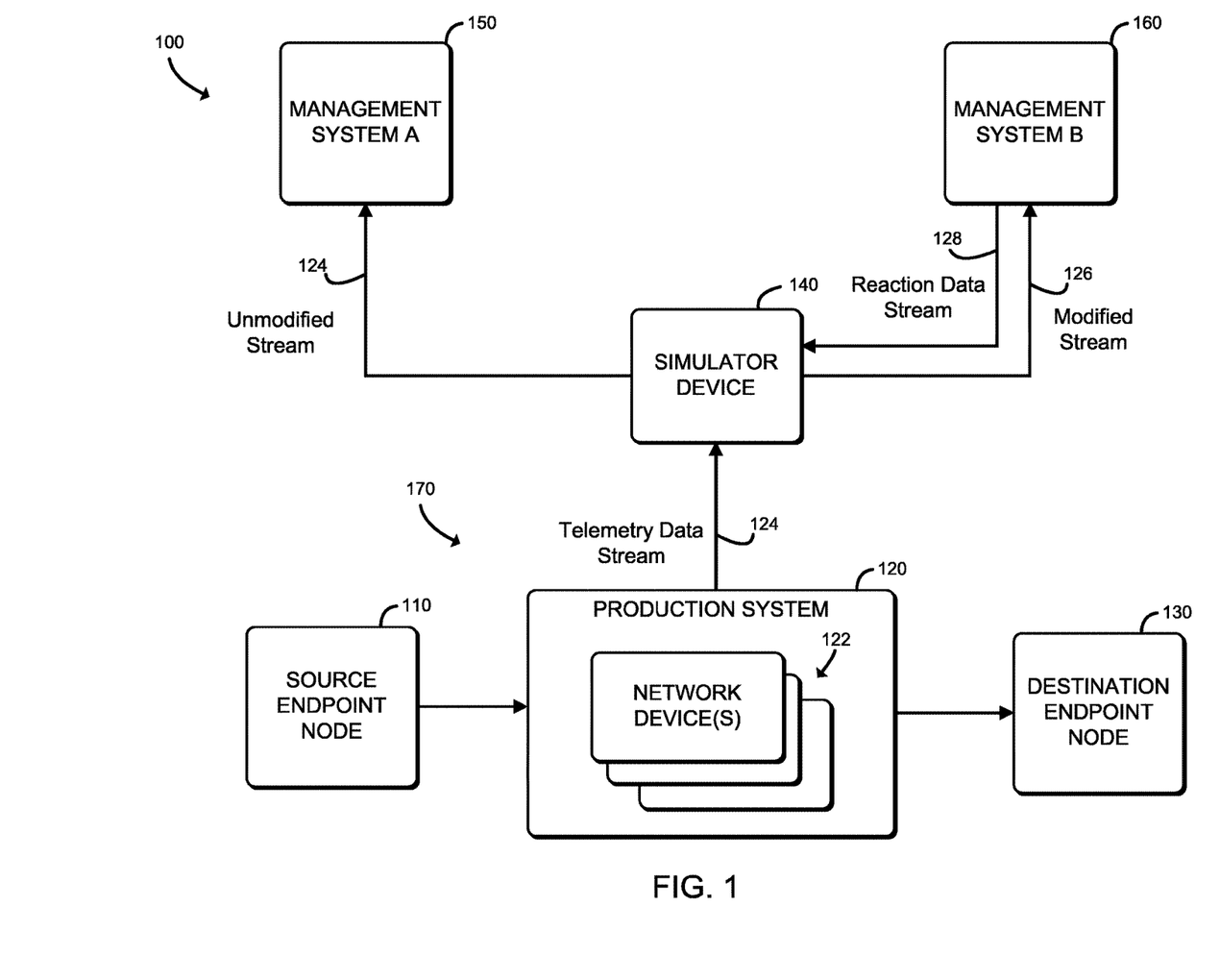
FIG. 1 is a simplified block diagram of at least one embodiment of a system for simulating service degradation that includes a production system coupled to a simulator device and two management systems.

Referring now to FIG. 1, in an illustrative embodiment, a system 100 for simulating service degradation includes a source endpoint node 110 and a destination endpoint node 130 in communication over a network 170 via a production system 120 that includes one or more network devices 122. In use, each network device 122 facilitates the transmission of network packets (e.g., based on workload type, flow information, etc.) between the source endpoint node 110 and the destination endpoint node 130 over the network 170. As described in more detail herein, production system 120 generates a telemetry data stream 124 and provides the telemetry data stream 124 to a simulator device 140, which passes the stream 124, unmodified, to a management system 150. The telemetry data stream 124 includes information about network traffic processed by the production system 120, security data indicative of the presence of security threats to the production system 120, storage data indicative of available storage capacity of the production system 120, thermal data indicative of one or more temperatures in the production system 120, virtualization load data indicative of loads associated with virtualized functions of the network devices 122, and/or other data indicative of the operation of the production system 120. The simulator device 140 also forks the stream 124, adds perturbations, and transmits the resulting modified data stream 126 to another management system 160. The perturbations are indicative of degradations in the operations of the production system 120. While the management system 150 operates on the unmodified telemetry data stream 124, which is indicative of the actual conditions in the production system 120, the other management system 160 reacts to the modified telemetry data stream 126. In doing so, the management system 160 identifies a cause of the simulated degradation and sends a reaction data stream 128 indicative of the reactions of automated processes and human operators in the management system 160 to the simulator device 140 for analysis. The reactions of the management system 160 are analyzed by the simulator device to determine how quickly and accurately the management system 160 identified the cause of the degradation. As such, the system 100 enables real-time training for responding to service degradations without affecting the operations of the live production system 120.

Figure 2:
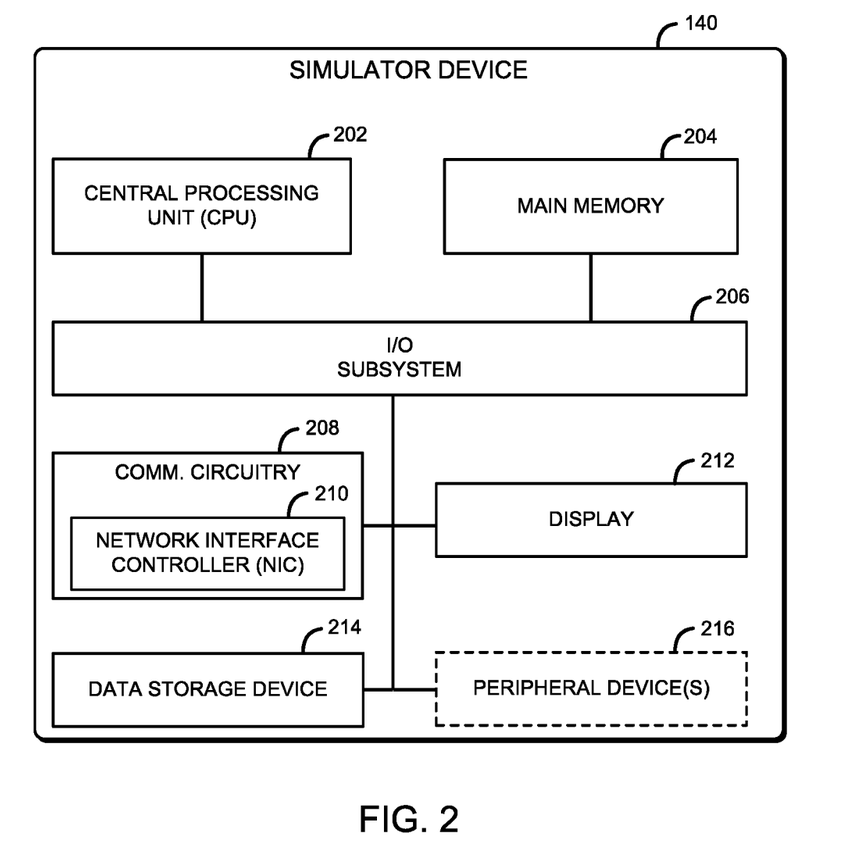
FIG. 2 is a simplified block diagram of at least one embodiment of the simulator device of the system of FIG. 1.

The simulator device 140 may be embodied as any type of computation or computing device capable of performing the functions described herein, including, without limitation, a computer, a distributed computing system, a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. Referring now to FIG. 2, an illustrative embodiment of the simulator device 140 includes a central processing unit (CPU) 202, a main memory 204, an input/output (I/O) subsystem 206, and communication circuitry 208. Of course, in other embodiments, the simulator device 140 may include other or additional components, such as those commonly found in a computer (e.g., data storage, display, peripheral devices, etc.). Additionally, in some embodiments, one or more of the illustrative components may be incorporated in, or otherwise form a portion of, another component. For example, in some embodiments, the main memory 204, or portions thereof, may be incorporated in the CPU 202.

The CPU 202 may be embodied as any type of processor capable of performing the functions described herein. The CPU 202 may be embodied as a single or multi-core processor(s), a microcontroller, or other processor or processing/controlling circuit. In some embodiments, the CPU 202 may be embodied as, include, or be coupled to a field programmable gate array (FPGA), an application specific integrated circuit (ASIC), reconfigurable hardware or hardware circuitry, or other specialized hardware to facilitate performance of the functions described herein. Similarly, the main memory 204 may be embodied as any type of volatile (e.g., dynamic random access memory (DRAM), etc.) or non-volatile memory or data storage capable of performing the functions described herein. In some embodiments, all or a portion of the main memory 204 may be integrated into the CPU 202. In operation, the main memory 204 may store various data and software used during operation of the simulator device 140 such as telemetry data, perturbation data, reaction data, configuration data, operating systems, applications, programs, libraries, and drivers.

The I/O subsystem 206 may be embodied as circuitry and/or components to facilitate input/output operations with the CPU 202, the main memory 204, and other components of the simulator device 140. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the CPU 202, the main memory 204, and other components of the simulator device 140, on a single integrated circuit chip.

The communication circuitry 208 may be embodied as any communication circuit, device, or collection thereof, capable of enabling communications over the network 170 between the simulator device 140, the production system 120, and/or the management systems 150, 160. The communication circuitry 208 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 208 includes a network interface controller (NIC) 210, which may also be referred to as a host fabric interface (HFI). The NIC 210 may be embodied as one or more add-in-boards, daughtercards, network interface cards, controller chips, chipsets, or other devices that may be used by the simulator device 140 to connect with the production system 120 and the management systems 150, 160. In some embodiments, the NIC 210 may be embodied as part of a system-on-a-chip (SoC) that includes one or more processors, or included on a multichip package that also contains one or more processors. In some embodiments, the NIC 210 may include a local processor (not shown) and/or a local memory (not shown) that are both local to the NIC 210. In such embodiments, the local processor of the NIC 210 may be capable of performing one or more of the functions of the CPU 202 described herein. Additionally or alternatively, in such embodiments, the local memory of the NIC 210 may be integrated into one or more components of the simulator device 140 at the board level, socket level, chip level, and/or other levels.

Additionally, the simulator device 140 may include a display 212. The display 212 may be embodied as, or otherwise use, any suitable display technology including, for example, a liquid crystal display (LCD), a light emitting diode (LED) display, a cathode ray tube (CRT) display, a plasma display, and/or other display usable in a compute device. The display 212 may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

The simulator device 140 may additionally include a data storage device 214, which may be embodied as any type of device or devices configured for short-term or long-term storage of data such as, for example, memory devices and circuits, memory cards, hard disk drives, solid-state drives, or other data storage devices. The data storage device 214 may include a system partition that stores data and firmware code for the data storage device 214. The data storage device 214 may also include an operating system partition that stores data files and executables for an operating system of the simulator device 140.

Additionally or alternatively, the simulator device 140 may include one or more peripheral devices 216. Such peripheral devices 216 may include any type of peripheral device commonly found in a compute device such as speakers, a mouse, a keyboard, and/or other input/output devices, interface devices, and/or other peripheral devices.

Referring back to FIG. 1, the source endpoint node 110, the destination endpoint node 130, the network devices 122 of the production system 120, and the management systems 150, 160 may each be embodied as any type of computation or computing device capable of performing the functions described herein, including, without limitation, a computer, a distributed computing system, a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. Each of the source endpoint node 110, the destination endpoint node 130, the network devices 122 of the production system 120, and the management systems 150, 160 may include components commonly found in a computing device such as a processor, memory, input/output subsystem, data storage, communication circuitry, etc.

The network 170 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof.

In some embodiments, the network 170 and/or the production system 120 may be embodied as or include one or more satellite-based networks. Such networks, especially those that are already in orbit such as the low earth orbit (LEO) Iridium network may be subjected to solar storm interference, and as such, may suffer from orbital shifts. As such, LEO satellite-based networks may benefit from periodic updates to routing tables that control fore, aft, right and left antenna communications. These periodic updates facilitate cross satellite communication connections and reduce the likelihood of "dropping" communications. This is because such communications are routed from satellite to satellite before they are transmitted to mobile gateways located closest a given point-to-point (user-to-user) communication. LEO satellite routing table adjustments are computed by ground-based systems based on telemetry sent from orbiting satellites traveling approximately 17,000 MPH at an average orbit of 500 miles. LEO satellites are unique in that they orbit at low altitudes to reduce latency as compared with geosynchronous satellites that are 20,000 miles higher. In such embodiments, the telemetry data includes not only orbital mechanical positioning information but also data on every sensor on the satellite (e.g., battery life sensors, etc.).

In such embodiments, the system 100 enables simulating, on the ground, "what if" scenarios for an active, live LEO satellite constellation. The forking of a telemetry data stream 124 may be delayed in some embodiments, because the effects of normal solar interference is gradual. That is, the updating of routing tables may occur within a two day period. This provides ample time to determine the state of the satellite constellation and perform "what if" scenarios using telemetry information collected for each active (live) satellite.

The process of adding perturbations to a forked telemetry stream (e.g., the modified telemetry data stream 126) may be used to simulate conditions that would be difficult to test in outer space. For example, the addition or removal of spare satellites may be analyzed on the ground using the forked telemetry data stream with corresponding perturbations. Re-routing communications and load-balancing can also be analyzed. Satellite maintenance and replacement scenarios can be studied using the forked telemetry data stream 126. LEO satellites, by definition, have a limited lifespan and are disposable once the battery life is expended. As such, in some embodiments, the simulator device 140 may add perturbations to the forked telemetry data stream 126 to indicate a battery status of one or more LEO satellites and may be used to identify scenarios in which a satellite should be deorbited.

Figure 3:
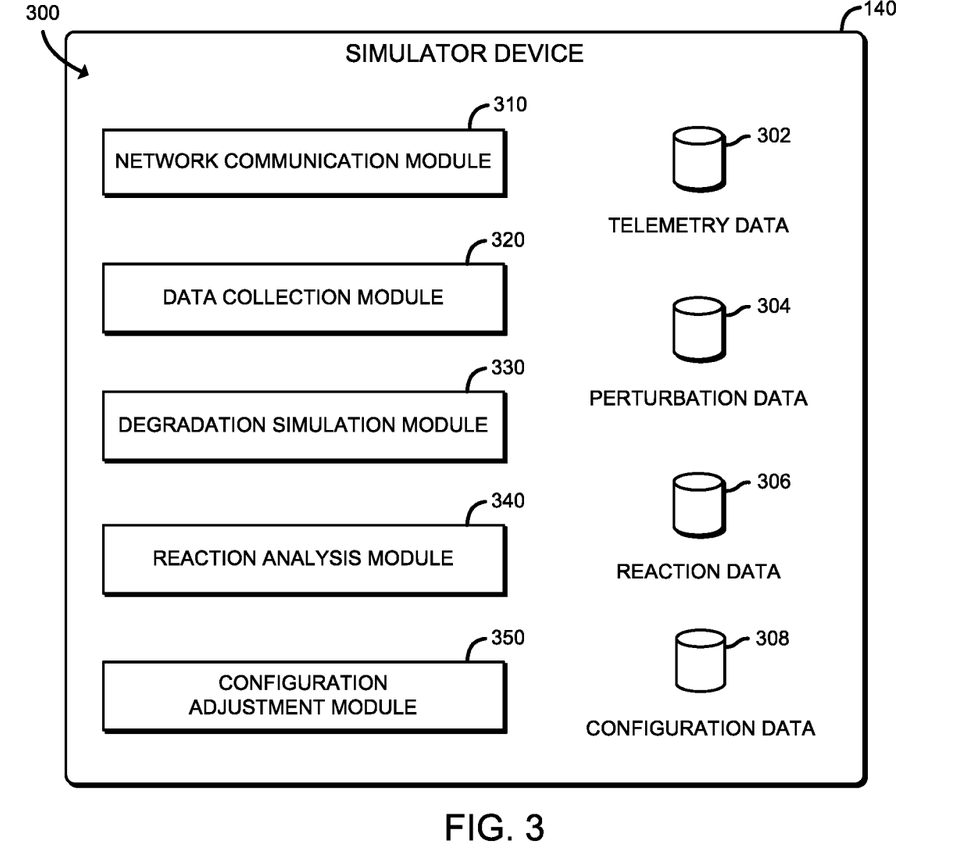
FIG. 3 is a simplified block diagram of at least one embodiment of an environment that may be established by the simulator device of FIGS. 1 and 2.

Referring now to FIG. 3, in the illustrative embodiment, each simulator device 140 may establish an environment 300 during operation. The illustrative environment 300 includes a network communication module 310, a data collection module 320, a degradation simulation module 330, a reaction analysis module 340, and a configuration adjustment module 350. Each of the modules, logic, and other components of the environment 300 may be embodied as hardware, firmware, software, or a combination thereof. As such, in some embodiments, one or more of the modules of the environment 300 may be embodied as circuitry or collection of electrical devices (e.g., network communication circuitry 310, data collection circuitry 320, degradation simulation circuitry 330, reaction analysis circuitry 340, configuration adjustment circuitry 350, etc.). It should be appreciated that, in such embodiments, one or more of the network communication circuitry 310, data collection circuitry 320, degradation simulation circuitry 330, reaction analysis circuitry 340, or configuration adjustment circuitry 350 may form a portion of one or more of the CPU 202, communication circuitry 208, main memory 204, I/O subsystem 206, and/or other components of the simulator device 140. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the CPU 202 or other components of the simulator device 140.

In the illustrative environment 300, the simulator device 140 also includes telemetry data 302, perturbation data 304, reaction data 306, and configuration data 308. The telemetry data 302 includes data received from the production system 120 in the telemetry data stream 124. As such, the telemetry data 302 may include any type of data indicative of the operation of the production system 120. For example, in the illustrative embodiment, the telemetry data 302 may include information about network traffic processed by the production system 120, security data indicative of the presence of security threats to the production system 120, storage data indicative of available storage capacity of the production system 120, thermal data indicative of one or more temperatures in the production system 120, virtualization load data indicative of loads associated with virtualized functions of the network devices 122, and/or other data indicative of the operation of the production system 120. The perturbation data 304 may include any type of data usable to simulate the effects of various types of degradation in the service of the production system 120. In the illustrative embodiment, the perturbation data 304 may include data indicative of an attack against components of the production system 120, a failure of one or more components of the production system 120, degradation in performance, such as erroneous data access, incorrect or slowed computations, or other degradations, in components of the production system 120, the removal of a subset of the telemetry data 302, abnormal actions taken by a new and untested component or function in the production system 120, or other events that may negatively impact the performance of the production system 120. The reaction data 306 includes data indicative of reactions of automated processes and human operators at the management system 160, such as information regarding a determination by the management system 160 of the cause of the simulated degradation and the amount of time that passed before the management system 160 arrived at its determination of the cause. Further, the configuration data 308 includes data indicative of a configuration of processes and rules that may be used to identify a cause of a service degradation. As such, the configuration data 308 may include weights or other training data to be used in a pattern matching model used by the management systems 150, 160 to identify causes of service degradation.

The network communication module 310, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the simulator device 140, respectively. To do so, the network communication module 310 is configured to receive and process data packets from one system or computing device (e.g., the production system 120) and to prepare and send data packets to another computing device or system (e.g., the management systems 150, 160). Accordingly, in some embodiments, at least a portion of the functionality of the network communication module 310 may be performed by the communication circuitry 208, and, in the illustrative embodiment, by the NIC 210.

The data collection module 320, which may be embodied as hardware, firmware, software, virtualized hardware, emulated architecture, and/or a combination thereof as discussed above, is configured to collect the telemetry data 302 from the production system 120 and the reaction data 306 from the management system 160. The degradation simulation module 330, which may be embodied as hardware, firmware, software, virtualized hardware, emulated architecture, and/or a combination thereof as discussed above, is configured to determine a service degradation type to simulate, as a function of a script, random selection, or input from a human operator, and apply perturbations from the perturbation data 304 to the telemetry data 302 to generate the modified telemetry data stream 126 to be sent to the management system 160.

The reaction analysis module 340, which may be embodied as hardware, firmware, software, virtualized hardware, emulated architecture, and/or a combination thereof, is configured to analyze the reaction data 306 collected by the data collection module 320 to determine an amount of time that passed between when the perturbation data 304 was added to the modified telemetry data stream 126 and when the management system 160 provided an identification of a cause of the service degradation represented in the modified telemetry data stream 126. Further, the reaction analysis module 340 is configured to compare the identification of the cause provided by the management system 160 to the service degradation type determined by the degradation simulation module 330 to determine an accuracy of the identification made by the management system 160 (e.g., whether the management system 160 correctly identified the simulated cause of the service degradation). Additionally, the configuration adjustment module 350, which may be embodied as hardware, firmware, software, virtualized hardware, emulated architecture, and/or a combination thereof, is configured to generate an adjustment to the configuration of the management systems 150, 160 to increase the accuracy and/or decrease the time to correctly identify the cause of a service degradation. As such, the configuration adjustment module 350 may update the configuration data 308 with adjusted rules, procedures, training model weights, and/or other information and provide the updated configuration data 308 to the management systems 150, 160. In the illustrative embodiment, as described in more detail herein, the simulator device 140 configures the management system 150 with the updated configuration data and when a new simulation is to be performed, the simulator device 140 copies the configuration of the management system 150 to the other management system 160.

Figure 4:
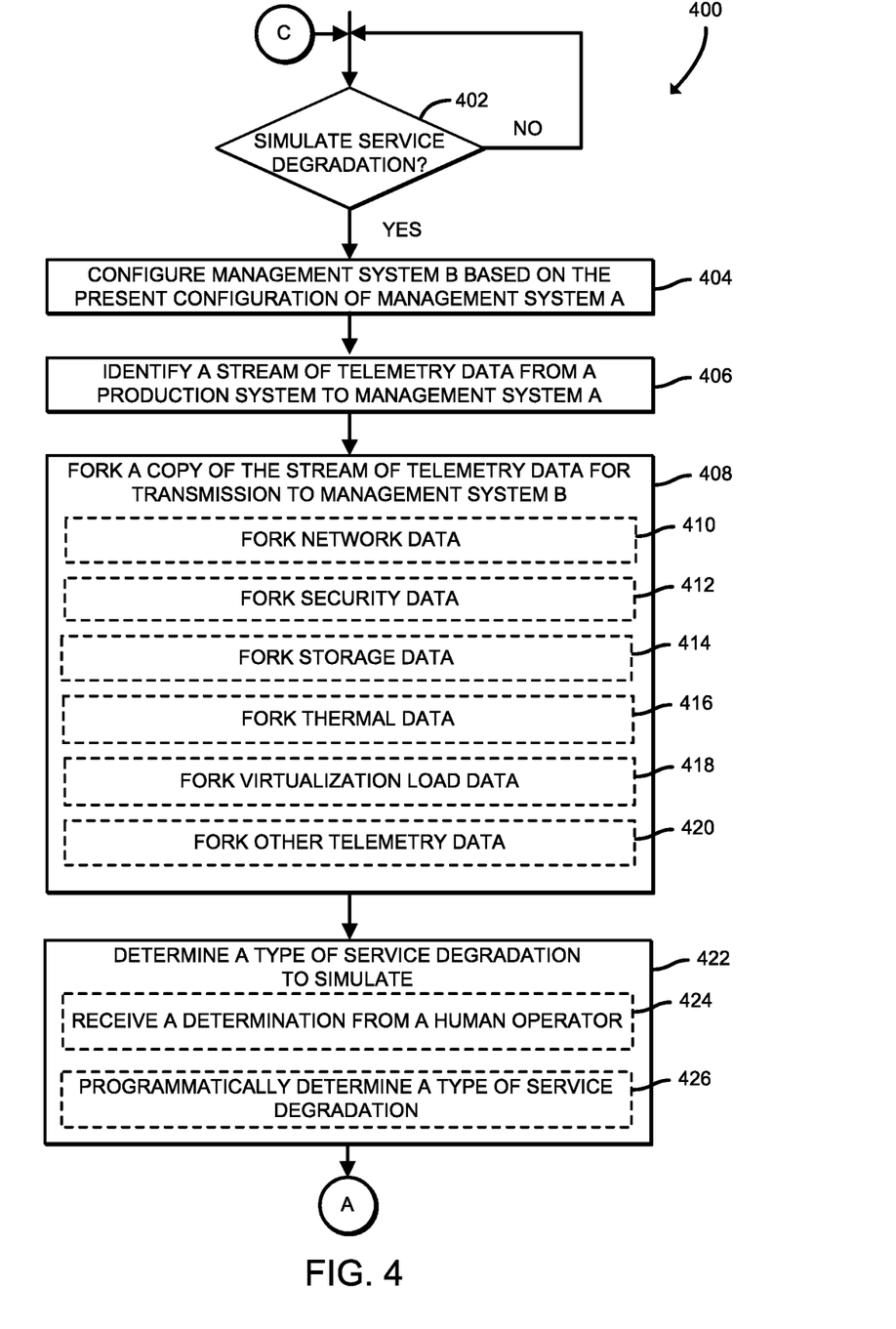
FIGS. 4-6 are a simplified flow diagram of at least one embodiment of a method for simulating service degradation by the simulator device of FIGS. 1 and 2.

Referring now to FIG. 4, in use, the simulator device 140 may execute a method 400 for simulating service degradation of the production system 120. The method 400 begins with block 402, in which the simulator device 140 determines whether to simulate degradation in service of the production system 120. In the illustrative embodiment, the simulator device 140 determines to simulate degradation in response to a user request input through a user interface (not shown). In other embodiments, the simulator device 140 determines to simulate degradation according to a predefined schedule. In other embodiments, the simulator device 140 determines to simulate service degradation based on one or more other factors. Regardless, in response to a determination to simulate service degradation, the method 400 advances to block 404 in which the simulator device 140 configures the management system 160 based on the present configuration of the management system 150. In the illustrative embodiment, the simulator device 140 obtains the configuration data 308 of the management system 150 and provides it to the management system 160 with a request to configure the management system 160 pursuant to the configuration data 308. This may include loading training data, such as weights, rules, and other settings into a pattern recognition model executed by the management system 160, updating procedures for human operators to follow, and/or other operations.

In block 406, the simulator device 140 identifies the telemetry data stream 124 from the production system 120 to the management system 150. As described with reference to FIG. 1, in the illustrative embodiment, the simulator device 140 is positioned within the network 170 to receive the telemetry data stream 124 and pass the telemetry data stream 124 to the management system 150 unmodified. As such, the simulator device 140 identifies this telemetry data stream 124 and, in block 408, the simulator device 140 forks (e.g., copies) the telemetry data stream 124. In doing so, as indicated in block 410, the simulator device 140 may fork network data indicative of network traffic processed by the production system 120. Additionally or alternatively, as indicated in block 412, the simulator device 140 may fork security data indicative of the presence of security threats to the production system 120. As indicated in block 414, the simulator device 140 may fork storage data indicative of available storage capacity of the production system 120. In addition, or as an alternative, the simulator device 140 may fork thermal data indicative of one or more temperatures in the production system 120, as indicated in block 416. The simulator device 140 may also fork virtualization load data indicative of loads associated with virtualized functions of the network devices 122 of the production system 120, as indicated in block 418. The simulator device 140 may also fork other data in the telemetry data stream 124 indicative of the operations and status of the production system 120, as indicated in block 420. In some embodiments, the other telemetry data may include satellite status information, such as a battery status, position, and/or orientation of one or more satellites. In forking the telemetry data stream 124, the simulator device may add or insert timing information to the forked stream. The Precision Time Protocol defined by the Institute of Electrical and Electronics Engineers ("PTP/ IEEE1588") or similar protocols or techniques may be used to support multiple capture sources (e.g., multiple network devices 122) and provide coordinated network timing.

In block 422, the simulator device 140 determines a type of service degradation to simulate. In other words, the simulator device 140 determines a simulated cause of a simulated service degradation to be indicated in the modified telemetry data stream 126 to be sent to the other management system 160. As indicated in block 424, the simulator device 140 may receive a determination of the service degradation type from a human operator, such as through a graphical user interface (not shown). In other embodiments, the simulator device 140 may programmatically determine a type of service degradation, such as through the execution of a script or through random selection from a set of available service degradation types.

Figure 5:
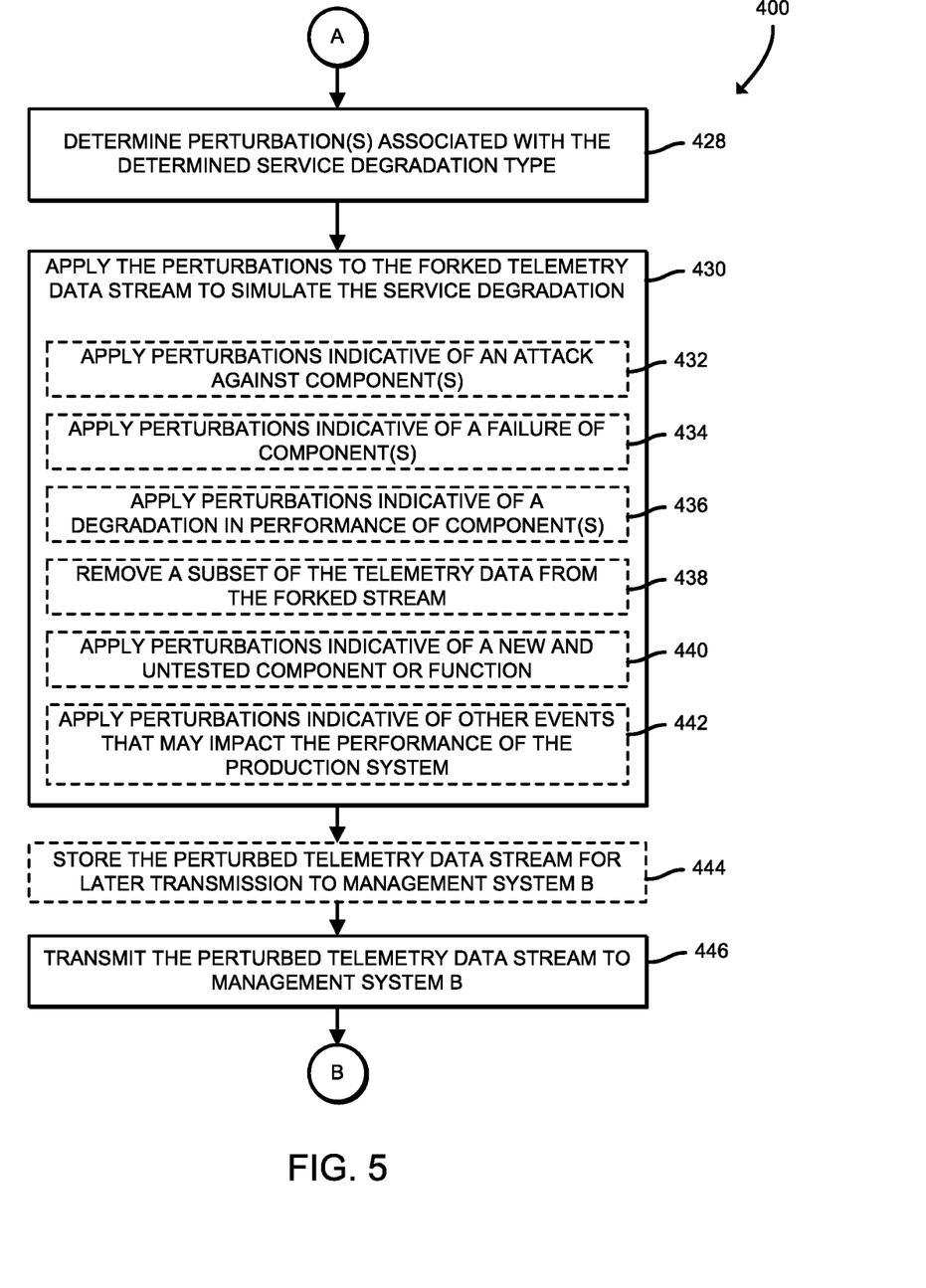

After the type of service degradation is determined in block 422, the method 400 advances to block 428 of FIG. 5. In block 428, the simulator device 140 determines perturbations associated with the determined service degradation type. In some embodiments, the perturbation data 304 may include different types of perturbations (e.g., signatures) to be included in the modified telemetry data stream 126 stored in association with particular service degradation types. As such, by selecting a particular service degradation type, the simulator device 140 may retrieve the corresponding predefined perturbations to be applied to the telemetry data 302. In some embodiments, the simulator device 140 may include a model of the production system 120 in which a human user or application may selectively affect the operations of particular network devices 122 or other components in the model of the production system 120 to produce a set of resulting perturbations.

In block 430, the simulator device 140 applies the perturbations to the forked telemetry data stream to simulate the determined type of service degradation. In doing so, the simulator device 140 may apply perturbations indicative of an attack against one or more components of the production system 120, such as malware detection messages or malware signatures in network packets from the production system 120, as indicated in block 432. The simulator device 140 may additionally or alternatively apply perturbations that are indicative of a failure one or more components of the production system 120, such as log entries indicating unresponsiveness of those components, as indicated in block 434. In some embodiments, the simulator device 140 may apply perturbations that are indicative of degradation in performance of one or more components of the production system 120, such as log messages indicating delayed performance of operations, as indicated in block 436. The simulator device 140 may remove a subset of the telemetry data from the forked stream, which may be indicative of a failure of the production system 120 to report data or a disruption in the network connection between the production system 120 and the management system 160, as indicated in block 438. In block 440, the simulator device 140 may apply perturbations indicative of a new and untested component or function in the production system 120, such as simulated test messages, indications of infinite loops, memory or processor resource hoarding, or other aberrant behavior. As indicated in block 442, the simulator device 140 may apply perturbations indicative of other events or conditions that may impact the performance of the production system 120, such as a satellite battery failure, a misoriented satellite, or other events. As indicated in block 444, in some embodiments, the simulator device 140 may store the perturbed telemetry data stream (e.g., the modified telemetry data stream 126) in memory for later transmission to the management system 160 rather than transmitting it immediately. In other embodiments, the simulator device 140 does not store the perturbed telemetry data stream for later transmission. Regardless, at some point, the simulator device 140 transmits the perturbed telemetry data stream (e.g., the modified telemetry data stream 126) to the management system 160, as indicated in block 446. It should be noted that both the telemetry data stream 124 and the modified telemetry data stream 126 may represent data from bidirectional communication rather than one way communication from the simulator device 140 to the management system 160. As an example, in some embodiments, a perturbation indicative of a failure or degradation in performance of a component of the production system 120 may be represented not by a log message affirmatively informing the recipient system (e.g., the management system 160) of the status of the component, but rather by a failure of the simulator device 140 to respond within an expected time frame to a query from the management system 160 intended for that component.

Figure 6:
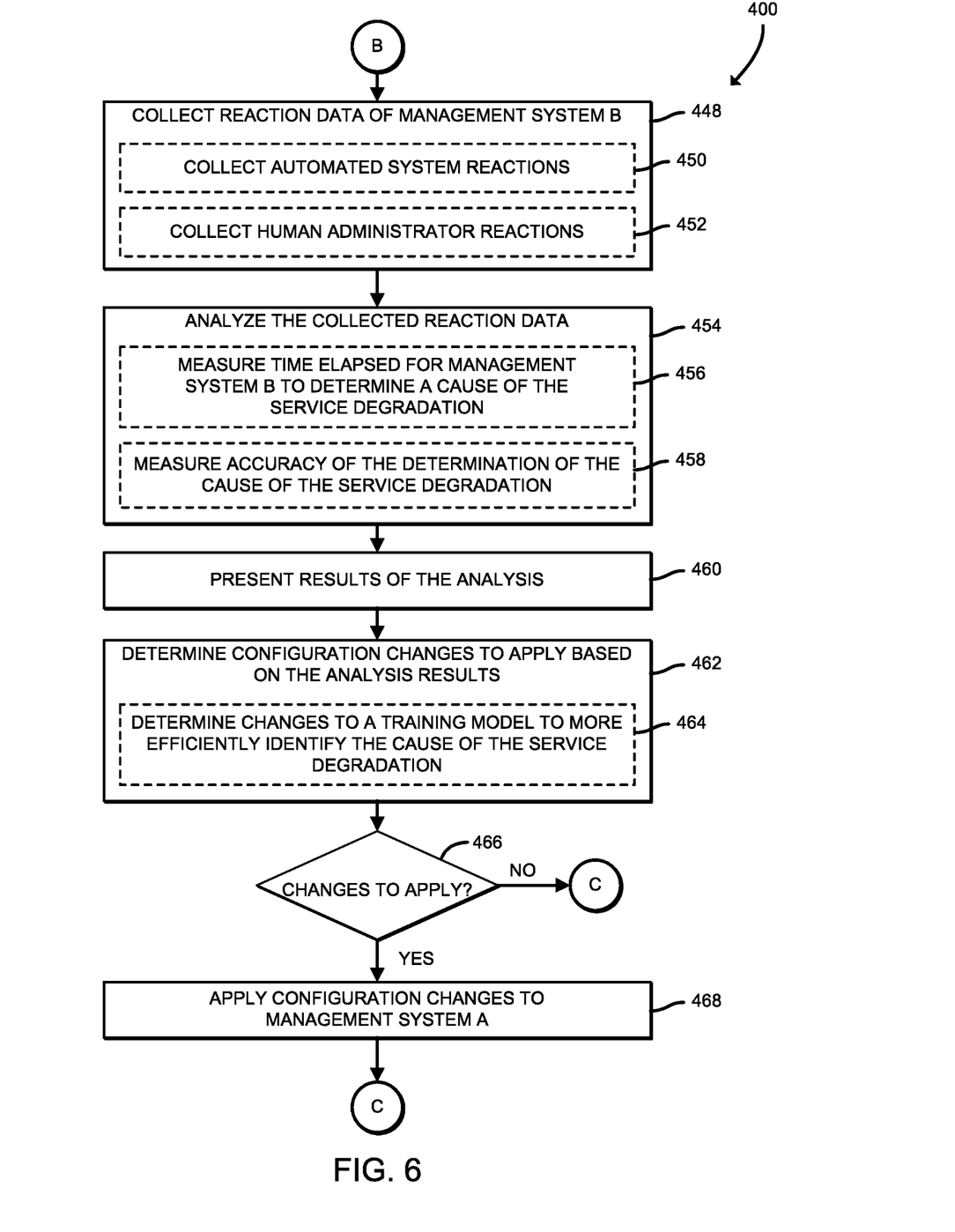

After the simulator device 140 has begun transmitting the perturbed telemetry data stream (e.g., the modified telemetry data stream 126) to the management system 160 in block 446, the method 400 advances to block 446 of FIG. 6. In block 446, the simulator device collects the reaction data 306 from the management system 160. In doing so, the simulator device 140 may collect automated system reactions, as indicated in block 450. Additionally or alternatively, the simulator device 140 may collect human administrator reactions, such as commands or other data input into a graphical user interface or through other mechanisms at the management system 160, as indicated in block 452. The reaction data 306 is indicative of a conclusion made at the management system 160 as to the cause of the service degradation, such as logs from automated processes identifying a cause of the simulated service degradation or information entered by human operators indicating an identification of the cause. In some embodiments, the reaction data 306 is embodied as commands issued by the management system 160 to counteract the supposed cause of the service degradation, such as commands to shift loads away from a network device 122 that the management system 160 has concluded has failed, a command to quarantine a process that the management system 160 has concluded to be malware, or other commands.

In block 454, the simulator device 140 analyzes the collected reaction data 306. In doing so, the simulator device 140 may measure the time that elapsed for the management system 160 to determine a cause of the service degradation, as indicated in block 456. Further, as indicated in block 458, the simulator device 140 may determine an accuracy of the determination as to the cause of the service degradation. In the illustrative embodiment, the simulator device 140 does so by comparing the determined type of service degradation from block 422 to the cause indicated in the reaction data 306 and determining whether there is a match. In some embodiments, the accuracy is not binary, but rather is a degree. As such, in some embodiments, the simulator device 140 may determine that the reaction data 306 correctly indicates the general cause of the service degradation but incorrectly identifies the component implicated in the cause. For example, the simulator device 140 may determine that the management system 160 correctly identified that a network device 122 was experiencing slowed performance, but the management system 160 was incorrect in its identification of the exact network device 122 in the production system 120 that was experiencing slowed performance. This may occur when a packet is processed by multiple network devices 122 in a pipeline and slowed performance by any of those network devices 122 adds a delay to the overall processing time for the packet.

In block 460, the simulator device 140 presents the results of the analysis performed in block 454. In doing so, the simulator device 140 may output the results in a graphical format to a graphical user interface for viewing by a human operator. In other embodiments, the simulator device 140 outputs the results to a log file, to a process executing on the simulator device 140 or on a remote computing device, or to another destination. In block 462, the simulator device 140 determines configuration changes to apply to the configuration data 308 based on the analysis of the results. In doing so, as indicated in block 464, the simulator device 140 may determine changes to a training model (e.g., a neural network or any other machine learning or artificial intelligence model to enable autonomous decision making) to more efficiently identify the cause of the service degradation. For example, if the results indicate that the management system 160 incorrectly identified the cause of the service degradation, the simulator device 140 may determine a rule to add to the configuration data 308 that associates the perturbations introduced into the telemetry data 302 with the determined service degradation type from block 422. In some embodiments, the simulator device 140 may determine adjustments to or deletions of rules that cause delay or uncertainty in correctly identifying the cause of the service degradation. Additionally or alternatively, the simulator device 140 may determine adjustments to weights used by a training model in identifying the cause of a service degradation. In block 466, the simulator device 140 determines whether any configuration changes were determined in block 462. If so, the simulator device 140 applies the changes to the configuration data 308 and provides the updated configuration data 308 to the management system 150, as indicated in block 468. Subsequently, or if the simulator device 140 determined that no there are no configuration changes to apply, the method loops back to block 402 of FIG. 4 in which the simulator device 140 again determines whether to simulate service degradation.

EXAMPLES

Illustrative examples of the technologies disclosed herein are provided below. An embodiment of the technologies may include any one or more, and any combination of, the examples described below.

Example 1 includes a simulator device to simulate service degradation in telemetry data, the simulator device comprising one or more processors; communication circuitry coupled to the one or more processors; one or more memory devices having stored therein a plurality of instructions that, when executed by the one or more processors, cause the simulator device to identify a telemetry data stream from a production system to a first management system; fork a copy of the telemetry data stream for transmission to a second management system; determine perturbations associated with a determined service degradation type; and apply the perturbations to the forked telemetry data stream.

Example 2 includes the subject matter of Example 1, and wherein plurality of instructions, when executed by the one or more processors, further cause the simulator device to store the perturbed telemetry data stream for later transmission to the second management system.

Example 3 includes the subject matter of any of Examples 1 and 2, and wherein the plurality of instructions, when executed by the one or more processors, further cause the simulator device to transmit the perturbed telemetry data stream to the second management system; collect reaction data associated with the second management system; and analyze the collected reaction data.

Example 4 includes the subject matter of any of Examples 1-3, and wherein to collect the reaction data comprises to collect at least one of an automated system reaction or a human administrator reaction.

Example 5 includes the subject matter of any of Examples 1-4, and wherein to analyze the collected reaction data comprises to measure an amount of time for the second management system to determine a cause of the service degradation.

Example 6 includes the subject matter of any of Examples 1-5, and wherein to analyze the collected reaction data comprises to determine an accuracy of a determination by the second management system of the cause of the service degradation.

Example 7 includes the subject matter of any of Examples 1-6, and wherein the plurality of instructions, when executed by the one or more processors, further cause the simulator device to present results of the analysis to a human operator.

Example 8 includes the subject matter of any of Examples 1-7, and wherein the plurality of instructions, when executed by the one or more processors, further cause the simulator device to determine configuration changes to apply to the first management system as a function of results of the analysis.

Example 9 includes the subject matter of any of Examples 1-8, and wherein to determine configuration changes comprises to determine changes to a training model associated with the first management system.

Example 10 includes the subject matter of any of Examples 1-9, and wherein the plurality of instructions, when executed by the one or more processors, further cause the simulator device to apply the configuration changes to the first management system.

Example 11 includes the subject matter of any of Examples 1-10, and wherein the plurality of instructions, when executed by the one or more processors, further cause the simulator device to apply the configuration changes to the second management system; retransmit the perturbed telemetry data stream to the second management system; and analyze a second reaction of the second management system to the perturbed telemetry data stream.

Example 12 includes the subject matter of any of Examples 1-11, and wherein to fork a copy of the telemetry data stream comprises to fork at least one of network data indicative of network traffic processed by the production system, security data indicative of a presence of security threat to the production system, storage data indicative of available storage capacity of the production system, thermal data indicative of one or more temperatures in the production system, virtualization load data indicative of a load associated with one more virtualized functions of the production system, or battery status data indicative of a status of a battery in a component of the production system.

Example 13 includes the subject matter of any of Examples 1-12, and wherein to apply the perturbations comprises to apply perturbations indicative of an attack against one or more components of the production system.

Example 14 includes the subject matter of any of Examples 1-13, and wherein to apply the perturbations comprises to apply perturbations indicative of a failure of one or more components of the production system.

Example 15 includes the subject matter of any of Examples 1-14, and wherein to apply the perturbations comprises to apply perturbations indicative of a degradation in performance of one or more components of the production system.

Example 16 includes the subject matter of any of Examples 1-15, and wherein to apply the perturbations comprises to remove a subset of the telemetry data from the forked telemetry data stream.

Example 17 includes the subject matter of any of Examples 1-16, and wherein to apply the perturbations comprises to apply perturbations indicative of an untested component or function in the production system.

Example 18 includes the subject matter of any of Examples 1-17, and wherein the production system includes one or more network devices to perform virtualized network functions and the first management system is to manage operations of the production system to maintain a target level of service and wherein the plurality of instructions, when executed by the one or more processors, further cause the simulator device to determine the service degradation type to simulate in the forked telemetry data stream.

Example 19 includes a method for simulating service degradation in telemetry data comprising identifying, by a simulator device, a telemetry data stream from a production system to a first management system; forking, by the simulator device, a copy of the telemetry data stream for transmission to a second management system; determining, by the simulator device, perturbations associated with a determined service degradation type; and applying, by the simulator device, the perturbations to the forked telemetry data stream.

Example 20 includes the subject matter of Example 19, and further including storing, by the simulator device, the perturbed telemetry data stream for later transmission to the second management system.

Example 21 includes the subject matter of any of Examples 19 and 20, and further including transmitting, by the simulator device, the perturbed telemetry data stream to the second management system; collecting, by the simulator device, reaction data associated with the second management system; and analyzing, by the simulator device, the collected reaction data.

Example 22 includes the subject matter of any of Examples 19-21, and wherein collecting the reaction data comprises collecting at least one of an automated system reaction or a human administrator reaction.

Example 23 includes the subject matter of any of Examples 19-22, and wherein analyzing the collected reaction data comprises measuring an amount of time for the second management system to determine a cause of the service degradation.

Example 24 includes the subject matter of any of Examples 19-23, and wherein analyzing the collected reaction data comprises determining an accuracy of a determination by the second management system of the cause of the service degradation.

Example 25 includes the subject matter of any of Examples 19-24, and further including presenting, by the simulator device, results of the analysis to a human operator.

Example 26 includes the subject matter of any of Examples 19-25, and further including determining, by the simulator device, configuration changes to apply to the first management system as a function of results of the analysis.

Example 27 includes the subject matter of any of Examples 19-26, and wherein determining configuration changes comprises determining changes to a training model associated with the first management system.

Example 28 includes the subject matter of any of Examples 19-27, and further including applying, by the simulator device, the configuration changes to the first management system.

Example 29 includes the subject matter of any of Examples 19-28, and further including applying, by the simulator device, the configuration changes to the second management system; retransmitting, by the simulator device, the perturbed telemetry data stream to the second management system; and analyzing, by the simulator device, a second reaction of the second management system to the perturbed telemetry data stream.

Example 30 includes the subject matter of any of Examples 19-29, and wherein forking a copy of the telemetry data stream comprises forking at least one of network data indicative of network traffic processed by the production system, security data indicative of a presence of security threat to the production system, storage data indicative of available storage capacity of the production system, thermal data indicative of one or more temperatures in the production system, virtualization load data indicative of a load associated with one more virtualized functions of the production system, or battery status data indicative of a status of a battery in a component of the production system.

Example 31 includes the subject matter of any of Examples 19-30, and wherein applying the perturbations comprises applying perturbations indicative of an attack against one or more components of the production system.

Example 32 includes the subject matter of any of Examples 19-31, and wherein applying the perturbations comprises applying perturbations indicative of a failure of one or more components of the production system.

Example 33 includes the subject matter of any of Examples 19-32, and wherein applying the perturbations comprises applying perturbations indicative of a degradation in performance of one or more components of the production system.

Example 34 includes the subject matter of any of Examples 19-33, and wherein applying the perturbations comprises removing a subset of the telemetry data from the forked telemetry data stream.

Example 35 includes the subject matter of any of Examples 19-34, and wherein applying the perturbations comprises applying perturbations indicative of an untested component or function in the production system.

Example 36 includes a simulator device comprising one or more processors; and one or more memory devices having stored therein a plurality of instructions that, when executed by the one or more processors, cause the simulator device to perform the method of any of Examples 19-35.

Example 37 includes one or more machine-readable storage media comprising a plurality of instructions stored thereon that in response to being executed, cause a simulator device to perform the method of any of Example 19-35.

Example 38 includes a simulator device comprising data collection circuitry to identify a telemetry data stream from a production system to a first management system; and degradation simulation circuitry to fork a copy of the telemetry data stream for transmission to a second management system, determine perturbations associated with a determined service degradation type, and apply the perturbations to the forked telemetry data stream.

Example 39 includes the subject matter of Example 38, and wherein the degradation simulation circuitry is further to store the perturbed telemetry data stream for later transmission to the second management system.

Example 40 includes the subject matter of any of Examples 38 and 39, and wherein the degradation simulation circuitry is further to transmit the perturbed telemetry data stream to the second management system, the simulator device further including reaction analysis circuitry to collect reaction data associated with the second management system and analyze the collected reaction data.

Example 41 includes the subject matter of any of Examples 38-40, and wherein to collect the reaction data comprises to collect at least one of an automated system reaction or a human administrator reaction.

Example 42 includes the subject matter of any of Examples 38-41, and wherein to analyze the collected reaction data comprises to measure an amount of time for the second management system to determine a cause of the service degradation.

Example 43 includes the subject matter of any of Examples 38-42, and wherein to analyze the collected reaction data comprises to determine an accuracy of a determination by the second management system of the cause of the service degradation.

Example 44 includes the subject matter of any of Examples 38-43, and wherein the reaction analysis circuitry is further to present results of the analysis to a human operator.

Example 45 includes the subject matter of any of Examples 38-44, and further including configuration adjustment circuitry to determine configuration changes to apply to the first management system as a function of results of the analysis.

Example 46 includes the subject matter of any of Examples 38-45, and wherein to determine configuration changes comprises to determine changes to a training model associated with the first management system.

Example 47 includes the subject matter of any of Examples 38-46, and further including configuration adjustment circuitry to apply the configuration changes to the first management system.

Example 48 includes the subject matter of any of Examples 38-47, and wherein the configuration adjustment circuitry is further to apply the configuration changes to the second management system and the degradation simulation circuitry is further to retransmit the perturbed telemetry data stream to the second management system, and the reaction analysis circuitry is further to analyze a second reaction of the second management system to the perturbed telemetry data stream.

Example 49 includes the subject matter of any of Examples 38-48, and wherein to fork a copy of the telemetry data stream comprises to fork at least one of network data indicative of network traffic processed by the production system, security data indicative of a presence of security threat to the production system, storage data indicative of available storage capacity of the production system, thermal data indicative of one or more temperatures in the production system, virtualization load data indicative of a load associated with one more virtualized functions of the production system, or battery status data indicative of a status of a battery in a component of the production system.

Example 50 includes the subject matter of any of Examples 38-49, and wherein to apply the perturbations comprises to apply perturbations indicative of an attack against one or more components of the production system.

Example 51 includes the subject matter of any of Examples 38-50, and wherein to apply the perturbations comprises to apply perturbations indicative of a failure of one or more components of the production system.

Example 52 includes the subject matter of any of Examples 38-51, and wherein to apply the perturbations comprises to apply perturbations indicative of a degradation in performance of one or more components of the production system.

Example 53 includes the subject matter of any of Examples 38-52, and wherein to apply the perturbations comprises to remove a subset of the telemetry data from the forked telemetry data stream.

Example 54 includes the subject matter of any of Examples 38-53, and wherein to apply the perturbations comprises to apply perturbations indicative of an untested component or function in the production system Example 55 includes a simulator device comprising circuitry for identifying a telemetry data stream from a production system to a first management system; circuitry for forking a copy of the telemetry data stream for transmission to a second management system; means for determining perturbations associated with a determined service degradation type; and means for applying the perturbations to the forked telemetry data stream.

Example 56 includes the subject matter of Example 55, and further including circuitry for storing the perturbed telemetry data stream for later transmission to the second management system.

Example 57 includes the subject matter of any of Examples 55 and 56, and further including circuitry for transmitting the perturbed telemetry data stream to the second management system; circuitry for collecting reaction data associated with the second management system; and means for analyzing the collected reaction data.

Example 58 includes the subject matter of any of Examples 55-57, and wherein the circuitry for collecting the reaction data comprises means for collecting at least one of an automated system reaction or a human administrator reaction.

Example 59 includes the subject matter of any of Examples 55-58, and wherein the means for analyzing the collected reaction data comprises means for measuring an amount of time for the second management system to determine a cause of the service degradation.

Example 60 includes the subject matter of any of Examples 55-59, and wherein the means for analyzing the collected reaction data comprises means for determining an accuracy of a determination by the second management system of the cause of the service degradation.

Example 61 includes the subject matter of any of Examples 55-60, and further including circuitry for presenting results of the analysis to a human operator.

Example 62 includes the subject matter of any of Examples 55-61, and further including means for determining configuration changes to apply to the first management system as a function of results of the analysis.

Example 63 includes the subject matter of any of Examples 55-62, and wherein the means for determining configuration changes comprises means for determining changes to a training model associated with the first management system.

Example 64 includes the subject matter of any of Examples 55-63, and further including means for applying the configuration changes to the first management system.

Example 65 includes the subject matter of any of Examples 55-64, and further including means for applying the configuration changes to the second management system; circuitry for retransmitting the perturbed telemetry data stream to the second management system; and means for analyzing a second reaction of the second management system to the perturbed telemetry data stream.

Example 66 includes the subject matter of any of Examples 55-65, and wherein the circuitry for forking a copy of the telemetry data stream comprises circuitry for forking at least one of network data indicative of network traffic processed by the production system, security data indicative of a presence of security threat to the production system, storage data indicative of available storage capacity of the production system, thermal data indicative of one or more temperatures in the production system, virtualization load data indicative of a load associated with one more virtualized functions of the production system, or battery status data indicative of a status of a battery in a component of the production system.

Example 67 includes the subject matter of any of Examples 55-66, and wherein the means for applying the perturbations comprises means for applying perturbations indicative of an attack against one or more components of the production system.

Example 68 includes the subject matter of any of Examples 55-67, and wherein the means for applying the perturbations comprises means for applying perturbations indicative of a failure of one or more components of the production system.

Example 69 includes the subject matter of any of Examples 55-68, and wherein the means for applying the perturbations comprises means for applying perturbations indicative of a degradation in performance of one or more components of the production system.

Example 70 includes the subject matter of any of Examples 55-69, and wherein the means for applying the perturbations comprises means for removing a subset of the telemetry data from the forked telemetry data stream.

Example 71 includes the subject matter of any of Examples 55-70, and wherein the means for applying the perturbations comprises means for applying perturbations indicative of an untested component or function in the production system.

The invention claimed is:

1. A simulator device to simulate service degradation in telemetry data, the simulator device comprising:
one or more processors;
communication circuitry coupled to the one or more processors;
one or more memory devices having stored therein a plurality of instructions that, when executed by the one or more processors, cause the simulator device to:
identify a telemetry data stream from a production system to a first management system;
pass the telemetry data stream, unmodified, to the first management system;
fork a copy of the telemetry data stream for transmission to a second management system;
determine perturbations associated with a determined service degradation type;
apply the perturbations to the forked telemetry data stream;
transmit the perturbed telemetry data stream to the second management system;
collect reaction data associated with the second management system;
analyze the collected reaction data comprising to measure one or more of: (i) an amount of time for the second management system to determine a cause of the service degradation or (ii) an accuracy of a determination by the second management system of the cause of the service degradation; and
determine, as a function of results of the analysis, configuration changes to a training model associated with the first management system to one or more of: (i) reduce the amount of time to determine the cause of the service degradation or (ii) increase the accuracy of the determination of the cause of the service degradation.

2. The simulator device of claim 1, wherein the plurality of instructions, when executed by the one or more processors, further cause the simulator device to store the perturbed telemetry data stream for later transmission to the second management system.

3. The simulator device of claim 1, wherein the plurality of instructions, when executed by the one or more processors, further cause the simulator device to present results of the analysis to a human operator.

4. The simulator device of claim 1, wherein the plurality of instructions, when executed by the one or more processors, further cause the simulator device to apply the configuration changes to the first management system.

5. The simulator device of claim 4, wherein the plurality of instructions, when executed by the one or more processors, further cause the simulator device to:
apply the configuration changes to the second management system;
retransmit the perturbed telemetry data stream to the second management system; and
analyze a second reaction of the second management system to the perturbed telemetry data stream.

6. The simulator device of claim 1, wherein to fork a copy of the telemetry data stream comprises to fork at least one of network data indicative of network traffic processed by the production system, security data indicative of a presence of security threat to the production system, storage data indicative of available storage capacity of the production system, thermal data indicative of one or more temperatures in the production system, virtualization load data indicative of a load associated with one more virtualized functions of the production system, or battery status data indicative of a status of a battery in a component of the production system.

7. The simulator device of claim 1, wherein the production system includes one or more network devices to perform virtualized network functions and the first management system is to manage operations of the production system to maintain a target level of service and wherein the plurality of instructions, when executed by the one or more processors, further cause the simulator device to determine the service degradation type to simulate in the forked telemetry data stream.

8. One or more machine-readable storage media comprising a plurality of instructions stored thereon that in response to being executed, cause a simulator device to:
identify a telemetry data stream from a production system to a first management system;
pass the telemetry data stream, unmodified, to the first management system;
fork a copy of the telemetry data stream for transmission to a second management system;
determine perturbations associated with a determined service degradation type;
apply the perturbations to the forked telemetry data stream;

transmit the perturbed telemetry data stream to the second management system;

collect reaction data associated with the second management system;

analyze the collected reaction data comprising to measure one or more of: (i) an amount of time for the second management system to determine a cause of the service degradation or (ii) an accuracy of a determination by the second management system of the cause of the service degradation; and determine, as a function of results of the analysis, configuration changes to a training model associated with the first management system to one or more of: (i) reduce the amount of time to determine the cause of the service degradation or (ii) increase the accuracy of the determination of the cause of the service degradation.

9. The one or more machine-readable storage media of claim 8, wherein the plurality of instructions further cause the simulator device to store the perturbed telemetry data stream for later transmission to the second management system.

10. The one or more machine-readable storage media of claim 8, wherein to collect the reaction data comprises to collect at least one of an automated system reaction or a human administrator reaction.

11. The one or more machine-readable storage media of claim 8, wherein the plurality of instructions further cause the simulator device to present results of the analysis to a human operator.

12. The one or more machine-readable storage media of claim 8, wherein the plurality of instructions further cause the simulator device to apply the configuration changes to the first management system.

13. The one or more machine-readable storage media of claim 12, wherein the plurality of instructions further cause the simulator device to:

apply the configuration changes to the second management system;

retransmit the perturbed telemetry data stream to the second management system; and analyze a second reaction of the second management system to the perturbed telemetry data stream.

14. The one or more machine-readable storage media of claim 8, wherein to fork a copy of the telemetry data stream comprises to fork at least one of network data indicative of network traffic processed by the production system, security data indicative of a presence of security threat to the production system, storage data indicative of available storage capacity of the production system, thermal data indicative of one or more temperatures in the production system, virtualization load data indicative of a load associated with one more virtualized functions of the production system, or battery status data indicative of a status of a battery in a component of the production system.

15. A simulator device comprising:
circuitry for identifying a telemetry data stream from a production system to a first management system;
circuitry for passing the telemetry data stream, unmodified, to the first management system;
circuitry for forking a copy of the telemetry data stream for transmission to a second management system;
circuitry for determining perturbations associated with a determined service degradation type;
circuitry means for applying the perturbations to the forked telemetry data stream;
circuitry for transmitting the perturbed telemetry data stream to the second management system;
circuitry for collecting reaction data associated with the second management system;
circuitry for analyzing the collected reaction data comprising to measure one or more of: (i) an amount of time for the second management system to determine a cause of the service degradation or (ii) an accuracy of a determination by the second management system of the cause of the service degradation; and
circuitry for determining, as a function of results of the analysis, configuration changes to a training model associated with the first management system to one or more of: (i) reduce the amount of time to determine the cause of the service degradation or (ii) increase the accuracy of the determination of the cause of the service degradation.

16. A method for simulating service degradation in telemetry data comprising:
identifying, by a simulator device, a telemetry data stream from a production system to a first management system;
passing the telemetry data stream, unmodified, to the first management system;
forking, by the simulator device, a copy of the telemetry data stream for transmission to a second management system;
determining, by the simulator device, perturbations associated with a determined service degradation type;
applying, by the simulator device, the perturbations to the forked telemetry data stream
transmitting, by the simulator device, the perturbed telemetry data stream to the second management system;
collecting, by the simulator device, reaction data associated with the second management system;
analyzing, by the simulator device, the collected reaction data comprising to measure one or more of: (i) an amount of time for the second management system to determine a cause of the service degradation or (ii) an accuracy of a determination by the second management system of the cause of the service degradation; and
determining, by the simulator device, as a function of results of the analysis, configuration changes to a training model associated with the first management system to one or more of: (i) reduce the amount of time to determine the cause of the service degradation or (ii) increase the accuracy of the determination of the cause of the service degradation.

17. The method of claim 16, further comprising storing, by the simulator device, the perturbed telemetry data stream for later transmission to the second management system.

18. The method of claim 16, wherein collecting the reaction data comprises collecting at least one of an automated system reaction or a human administrator reaction.

* * * * *